June 28, 1960     J. PAL     2,942,385
APPARATUS FOR MOVING PARTS OF MACHINERY ON A SUPPORT
Filed Feb. 16, 1956
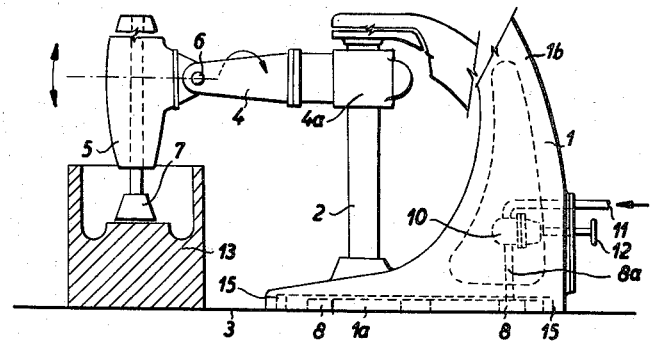
Fig. 1
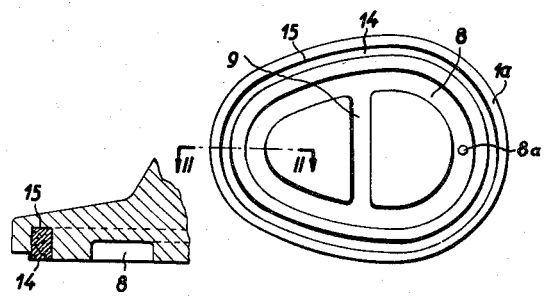
Fig. 2     Fig. 3
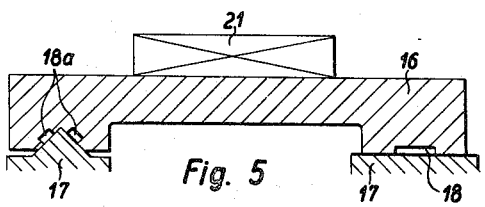
Fig. 5
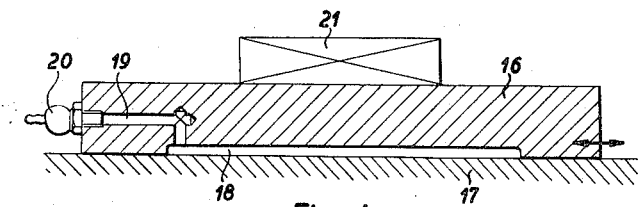
Fig. 4
INVENTOR
JOZSEF PAL
BY *Young, Emery & Thompson*
ATTORNEYS

United States Patent Office 2,942,385
Patented June 28, 1960

2,942,385

APPARATUS FOR MOVING PARTS OF MACHINERY ON A SUPPORT

József Pál, Budapest-Csepel, Hungary, assignor to "Licencia" Találmányokat Értékesitö Vállalat, Budapest, Hungary Filed Feb. 16, 1956, Ser. No. 565,998

2 Claims. (Cl. 51—170)

In practice some component-parts of a machinery must often be moved on a support or a basic surface for which purpose these parts may glide or roll on the support. In the first case the surfaces gliding on each other must be lubricated, but in most cases it is difficult to bring oil or grease between such surfaces and even in case of a good lubrication the moving is possible with the application of a relatively great force only and the surfaces engaging each other are quickly worn. If the moving is done by the mediation of rolls, wheels or the like, the moving is easy, but for this purpose an expensive running gear and maintenance is necessary.

The object of the invention is to facilitate the gliding movement to such an extent that large and heavy parts may be quickly and easily moved on a support or a basic surface without the use of a lubricator. For this purpose a plane and advantageously ground bearing surface of the part or object is provided with at least one groove or recess and this bearing surface is tightly placed on the plane support and thereafter a pressure medium, say compressed air is introduced into the said groove or recess, in such a way that the pressure of this medium tends to remove the part or object from the support.

One of the most important applications of the invention is to facilitate the gliding of reciprocating parts of working machines, especially of machine tools. So for example the slide of large planers, together with the workpiece fastened on the slide, must be moved to and fro on a guide surface and if the weight of such a slide is compensated according to the invention, the moving is easy, lubrication is not necessary and the wearing is very little.

Another very important application of the invention is the construction of a machine tool, particularly a grinding or milling machine, which is adapted to be moved or shifted on a working table. At the machining of component parts for different machines or apparatus plane or curved surfaces must be e.g. ground, filed or scraped but these operations are difficult, because the surfaces are not easily accessible. In some cases the machining of such surfaces had to be done manually, what is of course a lengthy and inexact operation.

The present invention makes it possible to construct a machine tool having a power driven tool and a plane, ground or lapped bearing surface which may be easily shifted on a support the surface of which is also plane, ground and lapped, in such a way that the bearing surface is provided with at least one groove, in which compressed air or another pressure medium is introduced, so that the major part of the weight of the machine is thus compensated and the machine does not stick or adhere to the support. In such a way the machine-tool may be moved on a working table or bench or on another support quickly and easily, without great effort and in any direction, so that the work piece may be machined in the desired way.

If no pressure medium would be used, the two ground and lapped surfaces would adhere to one another so strongly that the machine could not be moved manually and the lapped surfaces would wear very quickly.

In Figs. 1 to 3 of the accompanying drawing one embodiment of this machine-tool is shown by way of example and Figs. 4 and 5 illustrate the slide of a planer.

Fig. 1 is a diagrammatic side view.

Fig. 2 is a fragmentary vertical section.

Fig. 3 is a view of the basic surface, looking from below.

Fig. 4 is a diagrammatic vertical section of the said slide of a planer taken in the direction of movement.

Fig. 5 is a vertical section at right angle to the direction of movement of Fig. 4.

The frame 1 of the machine is built of an oval base portion 1a (Figs. 1 and 3) and of a curved upper part 1b, in which a column 2 is secured. The plane under surface of the base portion 1a has a high finish and is adapted to slide on the plane upper surface of a support 3, which may be a work table or bench, or it may be a portion of the work piece to be machined.

A horizontal arm 4 engages the said column 2 by means of its guiding part 4a in such a way that this arm may be moved up and down on the column and can be fixed at any desired position. The arm is also adapted to be rotated around a horizontal axis and has a head portion 5 hinged to the arm by means of pivot bolt 6. A motor, for example electromotor or compressed air motor, is situated in the head portion 5 in such a way that it drives the vertical shaft of the tool 7. This tool may be a grinding wheel, a polishing disc, a milling cutter, or the like.

In the base portion 1a there is an annular groove 8 having a cross section of an inverse U, the two opposite sides of this groove being connected by a cross groove 9. In the interior of the upper portion 1b of the frame a reducing valve 10 is situated and the compressed air, or $CO_2$, or other medium under pressure entering through pipe 11 is led through this reducing valve, from which it streams through channel 8a into the said grooves 8 and 9. Reducing valve 10 may be adjusted by means of a handle 12 in such a way that the pressure in grooves 8 and 9, though not enough for lifting the machine, suffices to enable the operator to move the machine with very little effort on the support 3. Thus the work piece 13 situated underneath of the tool 7 can be machined easily, quickly and very exactly. The drawing shows a pot-like working piece which clearly demonstrates that the machine according to the invention is suitable for an easy and exact machining of a surface not easily accessible.

The head portion 5 is adjustable in all directions, or at least in many directions for enabling the operator to machine surfaces having any inclination for any situation. For this purpose the arm 4 of the machine shown in the drawing may be raised, lowered, or turned around its longitudinal axis and the head 5 may be swung around a horizontal pivot. It is not necessary to provide more possibilities for adjustment, so for example it is not necessary to make possible the variation of the length of arm 4 or to turn this arm around a vertical axis, because such movements are done by sliding the whole machine on its support 3.

In the embodiment shown in the drawing, the frame of the machine is formed in such a way that it is at the same time a counter-weight for the parts secured on the column 2, because the upper part 1b is situated on one side and the said component parts on the other side of the base 1a. However, it is possible to use a counter-weight independent from the supporting of the parts 4 to 7.

If a milling cutter is secured on the head 5, surfaces may be milled which could not be machined up till now by this method because they were not accessible to a milling cutter. If upright or vertical surfaces should be milled, it is of course advantageous if the head portion 5 can be adjusted for turning the tool around a horizontal axis. For an easy machining of such surfaces it is advantageous to move the machine-tool on the support 3 along a guide, for which purpose a bearing surface is provided on the machine, which may be moved along a guide made on or in the support 3. This guide may have a special curved shape in which case the machining may be termed "copying."

Instead of the said guide the machine may be moved by means of a rod or lever system, for machining specially shaped surfaces. In some cases this system may consist of one single rod only, hinged on the support 3 or outside this support for guiding the machine along an arc or circular path. Such a guiding system enables the operator to machine without difficulties arched parts having a very long radius of say 2 or 3 meters. Up till now the milling or grinding of such parts was a difficult and lengthy operation.

The groove 8 in the under part of the frame is machined along the edge of the base in an annular shape because in such a way the advantage is attained that the machine tool cannot fall down from the support 3. This machine tool is namely so easily slidable on the support 3 that it may be inadvertently pushed to the edge of this support and so the operator runs the disk of pushing down the machine from the support. If, however, the groove 8 is formed according to the invention along the edge of the base portion, in the moment when the edge of this machine leaves the edge of the support, a small portion of the groove is already uncovered by the support and so the compressed air escapes on this place, so that the machine immediately adheres to the support and is instantly stopped by friction.

Finally it should be noted that the machine may be constructed in such a way that the shaft of the tool is driven by an electromotor which at the same time drives a blower so that the machine may be used in workshops having no source of compressed air or other pressure medium, as the compressed air needed for the purpose set forth may be drawn from the said blower.

The experience has shown that during the operation of the machine chips are falling onto table 3 and if the machine glides onto these chips, these small metal parts situated between the machine and the table, lift the machine with a few thousandths of an inch, so that the compressed air may escape and the ground surfaces are scored. To avoid this disadvantage a further annular groove 15 is machined along the edge of the base portion 1a accommodating a felt ribbon 14 or the like and outside this ribbon the under surface of the base portion is somewhat higher than the inner part of this surface, so that this outer annular portion does not touch the table, see Fig. 2. This felt ribbon is suitable to sweep away the chips and metal powder fallen onto the support 3, so that the said disadvantage is eliminated.

According to Figs. 4 and 5 the slide 16 of a planer and the work piece 21 fastened on it are moved to and fro on the guide 17 in the direction of the double arrow. The pressure medium is led from the source 20 through channel 19 into a groove 18 in the bottom surface of the slide. The function is substantially identical with that of the machine shown in Figs. 1 to 3, but at the grooves 18a forces are generated which are inclined with respect to the weight of the slide. This part of the guide of the planer has a prismatic shape, so that the weight of the slide is compensated by the resulting force of two components.

From the foregoing it is clear that the force pressing an object or part onto a supporting surface may be compensated, according to the invention, by means of the resultant of two or more component forces.

The compensation of the weight of the part is only possible, if the force generated by the pressure medium intersects the centre of gravity of the part, or, at least, if this force is very close to it, because otherwise one corner or one edge of the part is pressed to the support. For making possible in every case a compensating of the weight of the part by means of the force obtained by the use of the pressure medium, advantageously two or more grooves are provided in the bearing surface of the part, in such a way that these grooves are connected to separate sources. In such a way different pressures may be produced in the different grooves, for attaining that the weight of the part is evenly compensated on the whole area of the bearing surface.

The invention may be advantageously used for transport purposes too. So, for example, if work pieces or semi-finished products should be continuously forwarded from one part of the workshop to the other, these semi-finished parts may be placed onto slides gliding on plane supports, the weight being compensated by the method according to the invention. In such a way a very simple and reliable conveyor may be constructed, for example in such a way that the slide, pressed to the support by a little fraction of its weight only, glides down on an inclined path. In this case the slide is fixed by friction and rests immovable on the inclined path if no compressed air is let into the said grooves, however, in the moment when pressure is generated the slide starts its gliding movement; when the compressed air is allowed to escape, the slide is immediately stopped. Alternatively, the slide may stand immovable on the horizontal support with the grooves under pressure and may start gliding upon a little lifting of one end of the support or path, because the slide easily glides down on a little slope.

I claim:

1. A grinding machine of the character described having a base adapted to freely glide on a plane and smooth support, said base having a plane smooth under surface suitable for enabling the whole machine to glide in any direction on the said support, and adapted to tightly engage it, said base having an annular groove in the said under surface along its edge, a conduit coupling the said groove to a source of gas under pressure, and reducing valve means in said conduit for admitting said gas into said groove and for regulating its pressure, said gas tending to raise the whole machine from said support.

2. A machine according to claim 1 in which the base is provided with an outer annular groove surrounding the first-mentioned annular groove, and a felt member mounted in said outer annular groove for preventing foreign matter reaching the inner annular groove during movement of the base over the support.

References Cited in the file of this patent
UNITED STATES PATENTS

| | | |
|---|---|---|
| 1,991,177 | Rutz et al. | Feb. 12, 1935 |
| 2,440,919 | Shaw | May 4, 1948 |
| 2,603,539 | Brewster | July 15, 1952 |
| 2,710,234 | Hansen | June 7, 1955 |
| 2,743,787 | Seck | May 1, 1956 |